United States Patent

Tanguay

[15] 3,677,312
[45] July 18, 1972

[54] SLASHER FOR CUTTING TREE STEMS INTO LOGS OF SELECTED LENGTH

[72] Inventor: Jean Paul Tanguay, St. Prime, Quebec, Canada

[73] Assignee: Placements Jean Paul Tanguay Limited, Quebec, Canada

[22] Filed: Aug. 25, 1970

[21] Appl. No.: 66,804

[52] U.S. Cl. .................. 143/46 F, 143/157 E, 143/168 C
[51] Int. Cl. ............................. B27b 5/02, B27b 27/10
[58] Field of Search ............ 143/46 R, 46 F, 168 R, 168 C, 143/43 T, 157 E

[56] References Cited

UNITED STATES PATENTS

| | | | |
|---|---|---|---|
| 2,793,662 | 5/1957 | Öholm | 143/168 C X |
| 2,410,887 | 11/1946 | Locke | 143/46 F X |
| 3,457,971 | 7/1969 | Maradyn | 143/46 R X |

*Primary Examiner*—Donald R. Schran
*Attorney*—Raymond A. Robic

[57] ABSTRACT

A slasher for cutting tree stems into logs of predetermined selected length by means of a saw located at a cutting station, the stems being moved to cutting position by a first conveyor formed of spaced gripping rollers. A series of retractable arresting plates are provided on the first conveyor, downstream of the station, the plates being selectively movable upwardly to stop the stems to allow their being cut into logs of which the length corresponds to the position, along the conveyor, of the selected arresting plate. An endless conveyor travelling across the first conveyor and provided with upstanding discharge plates pushes the logs laterally off the first conveyor.

8 Claims, 8 Drawing Figures

PATENTED JUL 18 1972

INVENTOR
Jean Paul TANGUAY

ATTORNEY

INVENTOR
Jean Paul TANGUAY

ATTORNEY

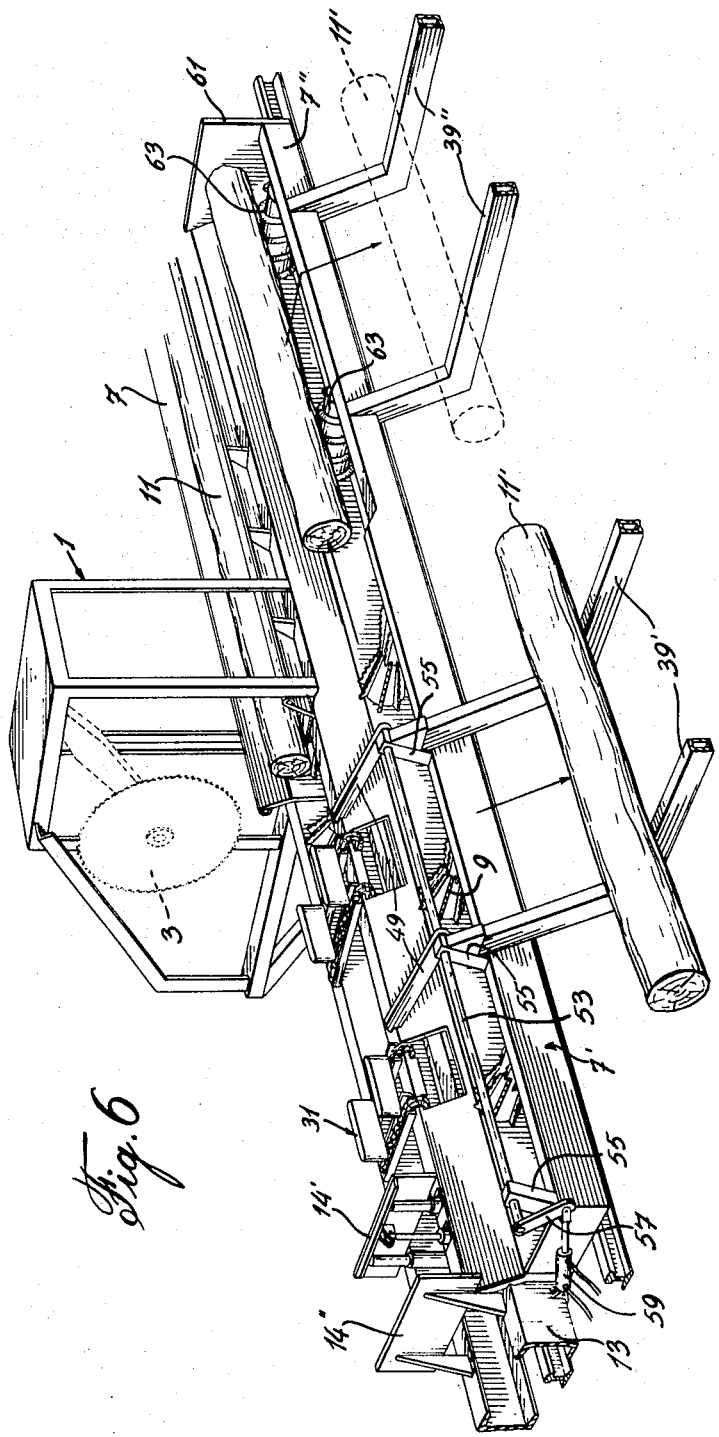

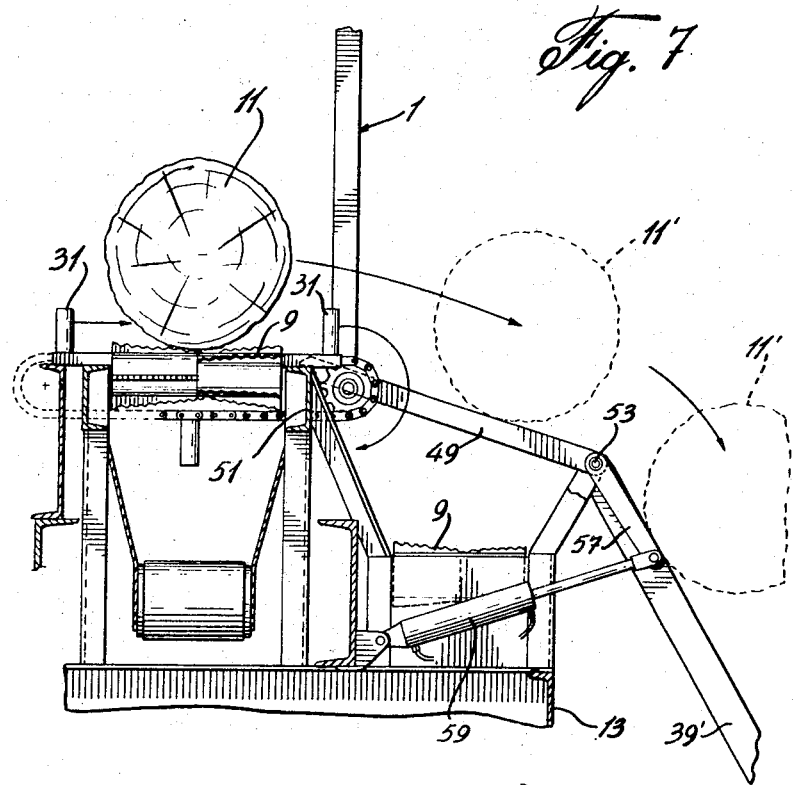
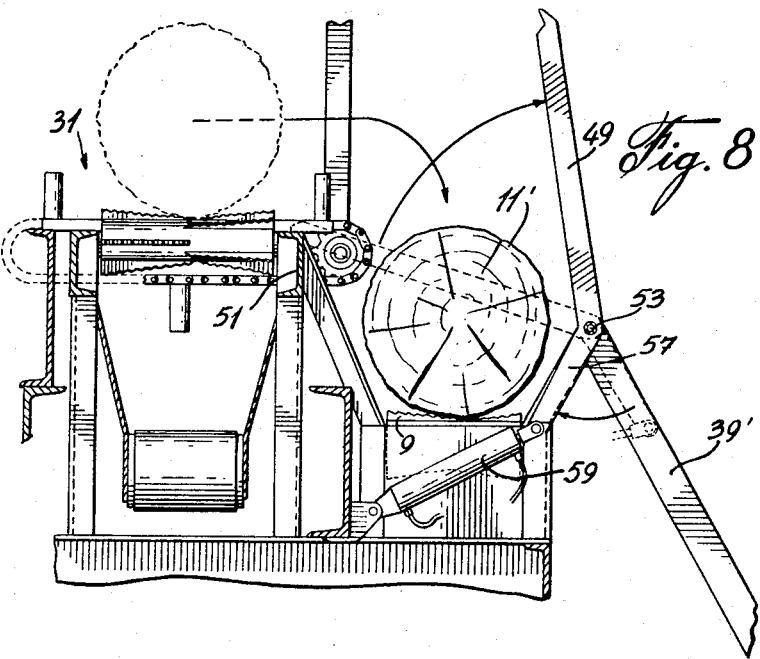

SLASHER FOR CUTTING TREE STEMS INTO LOGS OF SELECTED LENGTH

The present invention relates to a slasher for cutting tree stems and more specifically to a slasher capable of cutting logs in predetermined selected lengths.

Tree slashers for cutting stems into logs are already known as exemplified by my Canadian Pat. No. 796,109 of Oct. 8, 1968 and U.S. Pat. No. 3,500,882 of Mar. 17, 1970. However, this known slasher will cut tree stems in one predetermined length only, first cutting the stems into logs of twice the predetermined length and then cutting the said logs in half.

The present invention is an improvement over the presently known slashers in that it is possible therewith to cut tree stems into logs of predetermined selected lengths. Furthermore, the slasher of the present invention provides for discharging the logs on either side of the cutting station and at different locations.

More specifically, the slasher of the invention for cutting tree stems into logs of predetermined selected lengths and having a station provided with means for cutting the stems into logs and a conveyor that extends by the station for bringing the stems into cutting position is characterized by the provision of arresting devices distributed along the conveyor and extending thereacross on the downstream side of the conveyor with respect to the cutting station; power means operative to selectively move the arresting device from an inoperative retracted position that allows unobstructed movement of the stems on the conveyor to an operative lifted position wherein the selected one of the devices rises above the conveyor to stop the stems and allow them to be cut into logs of predetermined length that corresponds to the position of the particular arresting device in operation in respect of the cutting station, and discharging devices operative to move the logs laterally off the conveyor.

In a preferred form of the invention, the conveyor is formed of spaced gripping rollers and the arresting devices are plates movable upwardly to stand across the conveyor in the path of movement of the stems, each plate being located between two successive rollers.

Also in the preferred embodiment of the invention, each discharging device comprises an endless conveyor that extends between two successive rollers across the conveyor and pushing plates upwardly projecting from the endless conveyor in parallel relationship with the roller conveyor and spaced apart a distance approximately equal to the width of the roller conveyor.

It is believed that a better understanding of the invention will be afforded by the description that follows having reference to the appended drawings wherein:

FIG. 6 is a perspective view of a slasher made according to a second embodiment of the invention;

FIG. 7 is a transverse cross-sectional view of the slasher shown in FIG. 6;

FIG. 8 is a cross-sectional view similar to that of FIG. 7 illustrating the guiding ramp in inoperative position.

Figure 1:
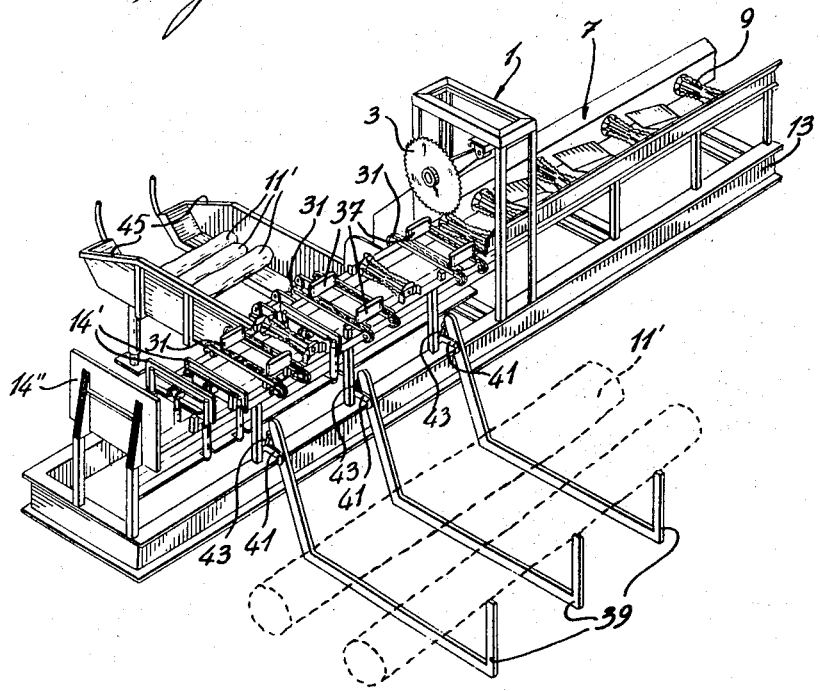
FIG. 1 is a perspective view of a slasher made according to the invention.

With reference to FIGS. 1 to 5, the slasher of the invention illustrates a cutting or sawing station 1 that may be of the type disclosed in my previously mentioned Canadian and U.S. patents. The station has the usual saw 3 operated by a power drive 5 (FIG. 5) of conventional design.

A main conveyor 7 having spaced transverse gripping rollers 9 that may be of the type disclosed in the aforesaid patents extends by and underneath the sawing station 1 for bringing the tree stems 11 into cutting position.

Both conveyor 7 and sawing station 1 are mounted on an elongated base 13 that may be wheeled as in my previous patents aforesaid. A series of arresting devices are distributed along conveyor 7 on the downstream side of the conveyor with respect to station 1.

Figure 2:
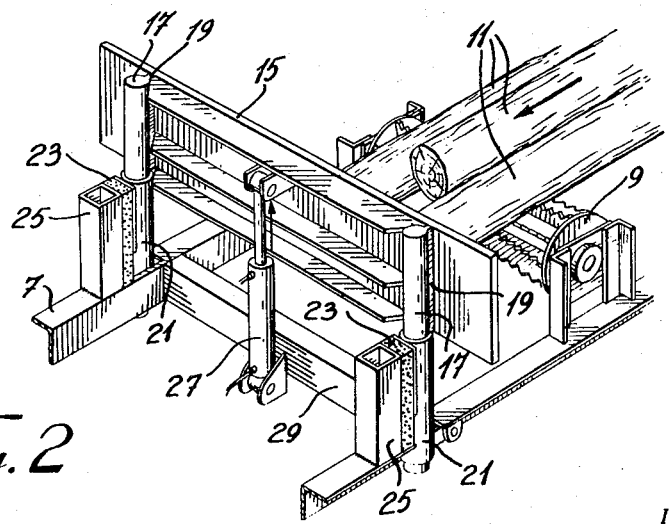
FIG. 2 is a perspective view of an arresting device for stopping the tree stems into cutting position.
Figure 3:
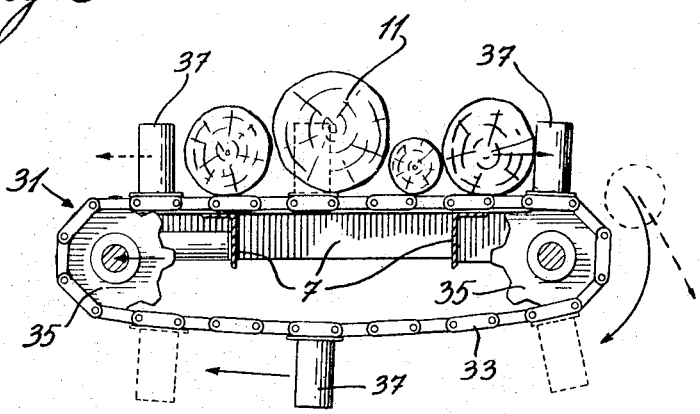
FIG. 3 is a transverse cross-sectional view of the tree stem conveyor intended to illustrate the endless conveyor intended to discharge the logs off the main conveyor.
Figure 4:
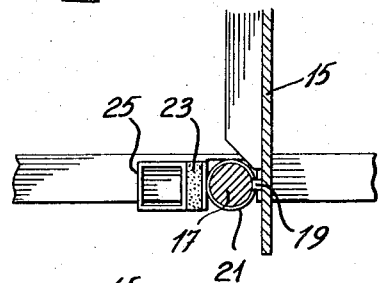
FIG. 4 is a plan view of a detail of the arresting device of FIG. 2.

The arresting devices are of the type illustrated in FIG. 2, and partly in FIG. 4, with each one comprising an upstanding plate 15 extending across the conveyor 7 and secured to rods 17 through narrow metal strips 19; the two rods being slidably received into floating cylinders 21, the strips 19 being guided through elongated axial slots (not shown) of the cylinders 21. The latter are secured to rubber pads 23 which are fixed to columnar bodies 25 mounted on the conveyor 7.

The arresting plate 15 is movable from an inoperative retracted position, allowing an obstructed movement of the stems 11 on the conveyor 7, to an operative lifted position such as shown in FIG. 2 wherein the plate stands across the path of movement of the stems 11 to stop them into cutting position. Reciprocating vertical movement of plate 15 is obtained by means of a hydraulic jack 27 of which the free end of the rod is pivotally mounted on the plate 15 while the lower end of the cylinder thereof is pivotally mounted onto a transverse brace 29 of the conveyor 7.

The number of arresting devices will depend on the number of different lengths of logs 11' desired. In the embodiment shown in FIGS. 1 through 5, three such arresting devices, identified by numeral 14', are shown and an additional stationary arresting plate 14'' is provided at the very end of the conveyor 7 (FIG. 1). Thus, by selectively using the arresting devices 14', it is possible to obtain logs in four different lengths, such as 4, 8, 10, and 14 feet.

The slasher of the invention further comprises discharging devices 31 for moving logs 11' laterally off the conveyor 7. One such discharging device is illustrated particularly in FIG. 3, on a larger scale.

It will be seen to comprise an endless conveyor made up of two chains 33 winding around two sprocket wheels 35 mounted on the conveyor 7 on any conventional manner. Endless chains 33, like arresting devices 14', extend between two successive rollers 9 of the conveyor 7 with the upper strand thereof standing unobstructively at a lower level than the top level of the rollers 9. Each discharging device comprises pushing plates 37 projecting upwardly from and secured to sprocket chains 33 in parallel relationship with the roller conveyor 7. Plates 37 are spaced apart a distance approximately equal to the width of the roller conveyor.

The discharging endless conveyors 31 can be operated either selectively or together as well as in either direction so that logs 11' may be pushed off on either side of conveyor 7.

Figure 5:
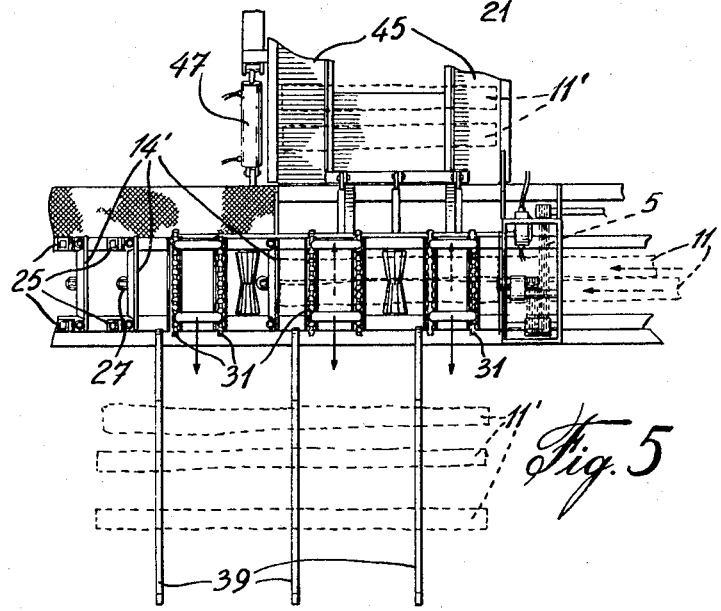
FIG. 5 is a plan view of the slasher of FIG. 1.

Various types of containers may be provided on each side of conveyor 7 to gather the logs, two types being shown in the embodiment illustrated in FIGS. 1 and 5.

One type consists of a series of generally U-shaped collectors 39 the inner branch of which being pivotally connected at 41 to the base 13 while the rods 43 of actuating hydraulic jacks (not shown) are connected at the tips thereof. This will permit upwardly lifting the collectors 31 if the slasher is to be displaced.

The other type of containers may be formed by two angular members 45 facing one another. Similarly to the container defined by collectors 39, the angular members 45 may be pivotally connected at the inner end to the base 13 and be lifted up by means of a jack 47 (FIG. 5) whenever it is intended to move the slasher to another location, thus appreciably reducing the overall width of the slasher.

The slasher illustrated in the embodiment of FIGS. 6, 7 and 8 differs from that of FIGS. 1 through 5 by the provision of means allowing logs to be discharged at one or more additional locations.

For this purpose, the slasher is provided with a second gripping roller conveyor 7' similar to and extending parallel with the first roller conveyor 7 but at a lower level. A guiding ramp sloping down laterally from the first roller conveyor 7 above this second roller conveyor 7' and downstream of the cutting station 1 allows discharging logs laterally off the conveyor 7.

The guiding ramp is seen to consist of a series of sloping arms 49 of which the free ends rest on one top lateral edge of the conveyor 7 which may be defined by the top flange of the channel member 51 (FIGS. 7 and 8). The other end of the arms 49 are secured on an operating axial 53 journalled across brackets 55 upstanding from the outer edge of conveyor 7'. Axle 53 and consequently ramp arms 49, are brought into rotation by means of a jack 59 the cylinder of which is mounted on the base 13 while the actuating rod is pivotally connected to the outer end of a link 57, the inner end of which is secured to axle 53 to radially project therefrom.

With the above description, it will be understood that logs 11' may be made to fall directly into containers 39', whenever the ramp arms 49 lie over the second gripping roller conveyor 7' as in FIG. 7, or directly into the said conveyor 7' whenever the ramp arms 49 are upwardly pivoted, as in FIG. 8.

The rollers of the second conveyor 7' are made to rotate in a direction reverse that of the first conveyor 7 so that any logs falling thereon will be driven in a direction reverse that of the logs on conveyor 7.

In this embodiment, the slasher includes a third roller conveyor 7'' provided in the continuation of the second roller 7' to receive logs therefrom. An arresting plate 61 prevents logs from falling off the conveyor at that end.

As will be noted, the rollers of conveyor 7'' are provided with helices at the periphery thereof, which periphery is outwardly tapered. Thus logs driven onto this conveyor 7'' will immediately be driven laterally into the adjacent collectors 39''.

It should also be pointed out that the rollers of second conveyor 7' could be made rotatable in either direction which would substantially increase the classification possibilities of the slasher.

Indeed, let us assume that conveyor 7 of the embodiment of FIGS. 6, 7 and 8 is provided with several retractable arresting plates 14' and a corresponding number of endless conveyors 31, as in FIG. 1. Then logs in a number of lengths equal to the number of plates 14' and conveyors 31 will be obtainable. Second conveyor 7' can then be lengthened on either side of collector 39' to provide additional outlets for the extra lengths of logs, additional arresting plates, such as 61, being also provided to force logs laterally into the selected collector. Obviously, the intermediate ones of such arresting plates would be of the retractable type, such as plates 14', while stationary plates, such as 61 would be useful only for the end conveyors.

I claim:

1. Slasher for cutting tree stems into logs of predetermined selected lengths, comprising:
   a. a station having means for cutting said stems into logs;
   b. a conveyor extending by said station for bringing said stems into cutting position, said conveyor comprising:
      an elongated base;
      a plurality of gripping rollers spacedly mounted on said base, and
      means to rotate said rollers to move said stems into cutting position;
   c. arresting devices distributed along said conveyor between successive rollers and extending thereacross on the downstream side of said conveyor with respect to said station, each arresting device comprising:
      cylinders upwardly projecting on either side of said base;
      rods slidably mounted in said cylinders;
      a plate fixed to said rod, and
      power means connected to said plate and operative selectively to move said plate from an inoperative retracted position, allowing unobstruated movement of said stems on said conveyor, to an operative lifted position wherein said plate rises above said conveyor in the path of said stems to stop the said stems and allow their being cut into logs of predetermined length corresponding to the position of said plate in respect of said station, and
   d. discharging devices operative to move said logs laterally off said conveyor.

2. Slasher as claimed in claim 1 wherein said arresting means further comprises columnar bodies fixed to and upstanding from said base on either side thereof and resilient pads secured to said bodies, said cylinders being free of said base and fixed to said pads.

3. Slasher as claimed in claim 2 wherein each discharging device comprises an endless conveyor extending between two successive rollers across said roller conveyor and pushing plates upwardly projecting from said endless conveyor in parallel relationship with said roller conveyor and spaced apart a distance approximately equal to the width of said roller conveyor.

4. Slasher as claimed in claim 3 further comprising a second gripping roller conveyor extending parallel with and at a lower level than the first roller conveyor; a guiding ramp sloping down laterally from said first roller conveyor above said second roller conveyor and downstream of said cutting station to discharge logs off said first roller conveyor and means moving said ramp away from above said second roller conveyor to allow said logs to fall into said second roller conveyor when discharged by one of said endless conveyors.

5. Slasher as claimed in claim 4 including a third roller conveyor in the continuation of said second roller conveyor to receive logs falling thereinto; the rollers of said third conveyor having peripheral helices to discharge logs laterally thereof.

6. Slasher as claimed in claim 1 wherein each discharging device comprises an endless conveyor extending between two successive rollers across said roller conveyor and pushing plates upwardly projecting from said endless conveyor in parallel relationship with said roller conveyor and spaced apart a distance approximately equal to the width of said roller conveyor.

7. Slasher as claimed in claim 6 further comprising a second gripping roller conveyor extending parallel with and at a lower level than the first roller conveyor; a guiding ramp sloping down laterally from said first roller conveyor above said second roller conveyor and downstream of said cutting station to discharge logs off said first roller conveyor and means moving said ramp away from above said second roller conveyor to allow said logs to fall into said second roller conveyor when discharged by one of said endless conveyors.

8. Slasher as claimed in claim 7 including a third roller conveyor in the continuation of said second roller conveyor to receive logs falling thereinto; the rollers of said third conveyor having peripheral helices to discharge logs laterally thereof.

* * * * *